US010715433B2

(12) United States Patent
Hoshino et al.

(10) Patent No.: US 10,715,433 B2
(45) Date of Patent: Jul. 14, 2020

(54) INFORMATION PROCESSING APPARATUS AND INFORMATION PROCESSING METHOD

(71) Applicant: Mitsubishi Electric Corporation, Tokyo (JP)

(72) Inventors: Daiki Hoshino, Tokyo (JP); Takuya Miyamaru, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/340,382

(22) PCT Filed: Mar. 31, 2017

(86) PCT No.: PCT/JP2017/013807
§ 371 (c)(1),
(2) Date: Apr. 9, 2019

(87) PCT Pub. No.: WO2018/179413
PCT Pub. Date: Oct. 4, 2018

(65) Prior Publication Data
US 2019/0363982 A1    Nov. 28, 2019

(51) Int. Cl.
*H04L 12/28* (2006.01)
*H04L 12/741* (2013.01)
(Continued)

(52) U.S. Cl.
CPC .......... *H04L 45/74* (2013.01); *G06F 9/45558* (2013.01); *H04L 43/028* (2013.01);
(Continued)

(58) Field of Classification Search
CPC ..... H04L 45/74; H04L 43/028; H04L 61/103; H04L 61/6022; G06F 9/45558; G06F 2009/45595
See application file for complete search history.

(56) References Cited

U.S. PATENT DOCUMENTS 7,283,534 B1 * 10/2007 Kelly ................ H04L 12/4641
370/351
7,464,183 B1 * 12/2008 Ioffe ................. H04L 29/12028
709/217
(Continued)

FOREIGN PATENT DOCUMENTS

JP    2008-526109 A    7/2008
JP    2011-145963 A    7/2011
(Continued)

OTHER PUBLICATIONS

Decision to Grant a Patent received for Japanese Patent Application No. 2018-508246, dated Mar. 27, 2018, 6 pages including English Translation.
(Continued)

*Primary Examiner* — Stephen M D Agosta
(74) *Attorney, Agent, or Firm* — Xsensus LLP

(57) ABSTRACT

An information processing apparatus includes a plurality of virtual machines each having a function of sending an address request for communication data to an outside, and sending communication data to a destination address received as a response to the address request. The apparatus further includes a communication debugger that logs first communication data between the virtual machine and another virtual machine. Upon receiving an address request from the virtual machine, the communication debugger sends an address of the communication debugger as the destination address, to the virtual machine, and logs the communication data sent from the virtual machine.

10 Claims, 6 Drawing Sheets

(51) Int. Cl.
  *G06F 9/455* (2018.01)
  *H04L 12/26* (2006.01)
  *H04L 29/12* (2006.01)

(52) U.S. Cl.
  CPC .. *H04L 61/103* (2013.01); *G06F 2009/45595* (2013.01); *H04L 61/6022* (2013.01)

(56) References Cited

U.S. PATENT DOCUMENTS

| | | | |
|---|---|---|---|
| 8,370,933 B1* | 2/2013 | Buckler | H04L 63/14 709/223 |
| 9,331,915 B1* | 5/2016 | Brandwine | H04L 43/04 |
| 2002/0075809 A1* | 6/2002 | Phaal | H04L 41/0213 370/245 |
| 2007/0248029 A1 | 10/2007 | Merkey et al. | |
| 2011/0179294 A1 | 7/2011 | Hagiuda | |
| 2011/0231570 A1* | 9/2011 | Altekar | H04L 12/4633 709/236 |
| 2013/0227566 A1 | 8/2013 | Higuchi et al. | |
| 2013/0268652 A1* | 10/2013 | Hugard, IV | H04W 4/38 709/224 |
| 2014/0075041 A1* | 3/2014 | Keesara | H04L 49/20 709/231 |
| 2014/0098822 A1* | 4/2014 | Galles | H04L 49/208 370/412 |
| 2014/0149569 A1* | 5/2014 | Wittenstein | H04L 43/12 709/224 |
| 2014/0317623 A1 | 10/2014 | Yokoyama | |
| 2014/0344811 A1 | 11/2014 | Suzuki | |
| 2015/0295943 A1* | 10/2015 | Malachi | H04L 63/145 726/24 |
| 2016/0182336 A1* | 6/2016 | Doctor | H04L 43/062 709/224 |
| 2017/0153686 A1* | 6/2017 | Wakamatsu | G06F 1/3234 |

FOREIGN PATENT DOCUMENTS

| | | |
|---|---|---|
| JP | 2013-175075 A | 9/2013 |
| JP | 2013-197919 A | 9/2013 |
| JP | 2014-216991 A | 11/2014 |
| JP | 2016-012801 A | 1/2016 |
| WO | 2013/111343 A1 | 8/2013 |
| WO | 2013/114620 A1 | 8/2013 |

OTHER PUBLICATIONS

International Search Report dated Jun. 6, 2017 for PCT/JP2017/013807 filed on Mar. 31, 2017, 8 pages including English Translation.

* cited by examiner

INFORMATION PROCESSING APPARATUS AND INFORMATION PROCESSING METHOD

CROSS-REFERENCE TO RELATED APPLICATIONS

The present application is based on PCT filing PCT/JP2017/013807, filed Mar. 31, 2017, the entire contents of which are incorporated herein by reference.

FIELD

The present invention relates to an information processing apparatus for performing a logging operation, and to an information processing method for performing the logging operation.

BACKGROUND

Hypervisors have been developed as a technology for virtualizing a computer hardware configuration by software to implement plural virtual machines in a physical computer, such that these virtual machines run in parallel using an operating system (OS) independent of the OS that operates the physical computer. Such a hypervisor creates virtual machines that each behave like computer hardware to operate various OS's on the virtual machines.

One example of a device using a hypervisor is a communication device described in Patent Literature 1. The communication device of Patent Literature 1 includes, on a hypervisor, a capture processing unit that captures communication data between virtual machines. The capture processing unit acquires communication data transferred from a first virtual machine to a second virtual machine, and stores the acquired communication data in a storage unit, thus to log the communication data.

CITATION LIST

Patent Literature

Patent Literature 1: Japanese Patent Application Laid-open No. 2016-12801

SUMMARY

Technical Problem

Unfortunately, the prior art communication device of Patent Literature 1, which captures communication data transferred through a communication path between the first virtual machine and the second virtual machine, requires a dedicated hardware element for capturing such communication data. For the communication device of Patent Literature 1, moreover, the memory area of the capturing device is an abstract one provided by a virtual machine, which poses a problem of complication of a mechanism for the virtual machine to access the memory area.

The present invention has been made in view of the foregoing, and it is an object of the present invention to obtain an information processing apparatus providing a simple configuration capable of logging communication data between virtual machines.

Solution to Problem

To solve the above problem and achieve the object, an information processing apparatus of the present invention comprises: a plurality of virtual machines each having a function of making an address request for communication data to an outside, and sending communication data to a destination address received as a response to the address request; and a communication logging unit to log first communication data between the virtual machine and another virtual machine, wherein, upon receiving an address request from the virtual machine, the communication logging unit sends an address of the communication logging unit as a destination address, to the virtual machine, and logs the communication data sent from the virtual machine.

Advantageous Effects of Invention

An information processing apparatus according to the present invention provides an advantageous effect of providing the simple configuration capable of logging the content of communication between the virtual machines.

DESCRIPTION OF EMBODIMENTS

An information processing apparatus and an information processing method according to embodiments of the present invention will be described in detail below with reference to the drawings. Note that these embodiments are not intended to limit the scope of this invention.

First Embodiment

Figure 1:
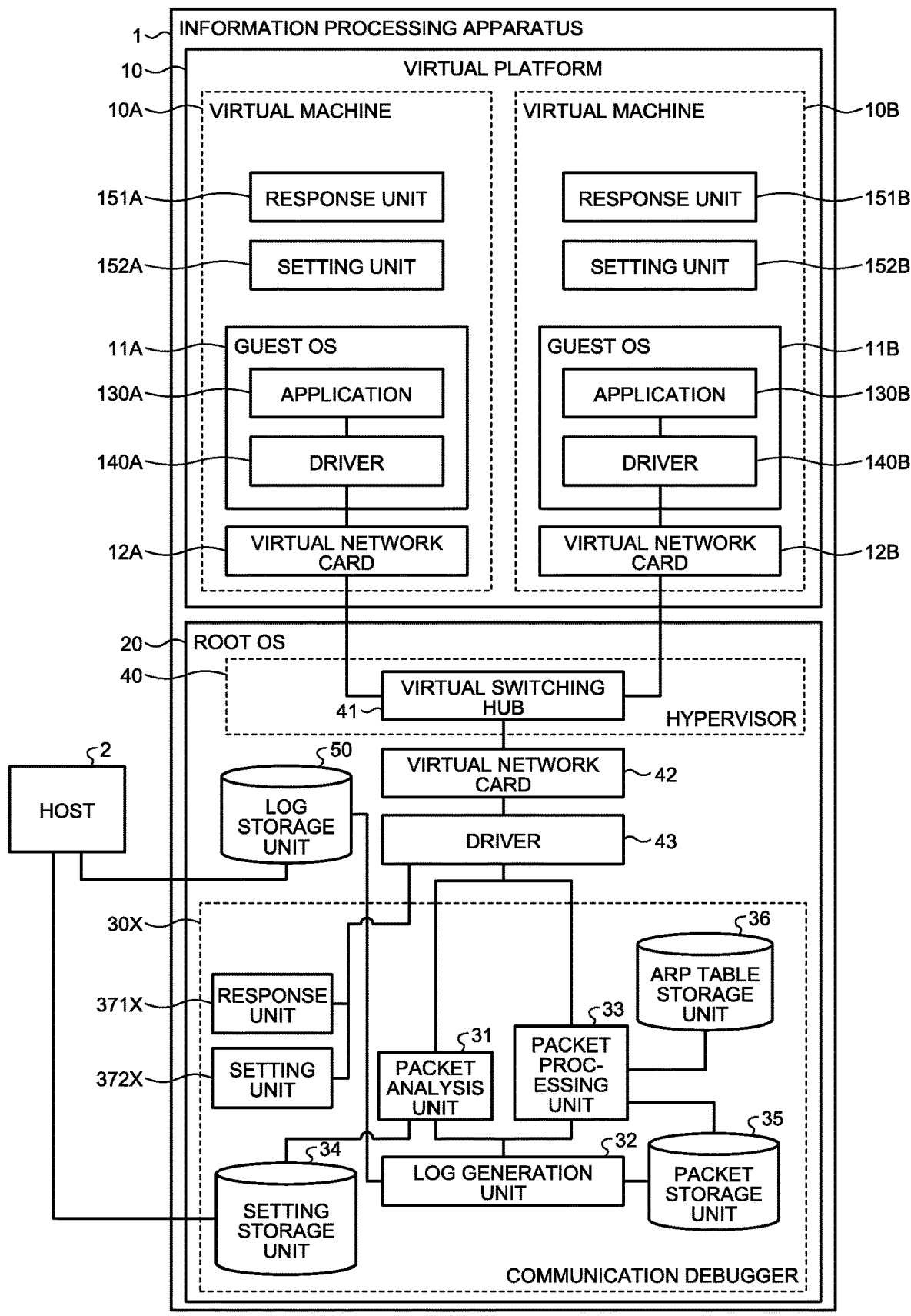
FIG. 1 is a unit diagram illustrating a configuration of an information processing apparatus according to a first embodiment of the present invention.

FIG. 1 is a unit diagram illustrating a configuration of an information processing apparatus according to a first embodiment of the present invention. An information processing apparatus 1 of the first embodiment is a computer applied to an industrial personal computer (IPC). The information processing apparatus 1 is configured to be connectable to multiple controllers not illustrated. The information processing apparatus 1 sends various pieces of information to plural controllers, and receives various pieces of information from plural controllers. The controllers connected to the information processing apparatus 1 are each a programmable logic controller (PLC) that controls a device such as a robot.

The information processing apparatus 1 is connected to a host 2, which is an external device, as illustrated in FIG. 1. The information processing apparatus 1 is configured to receive an instruction received by the host 2 from a user. The information processing apparatus 1 performs various processing in accordance with information sent from the host 2. When providing the information processing apparatus 1 with settings, the user inputs into the host 2 an instruction for the information processing apparatus 1. This causes the host 2 to send the instruction data from the user, to the information processing apparatus 1.

The information processing apparatus 1 implements a conventional Internet protocol (IP) stack. The information processing apparatus 1 includes a virtual platform 10, which is a virtualized platform, and a root OS 20 that controls the virtual platform 10. The virtual platform 10 includes virtual machines 10A and 10B that operate independently of the root OS 20.

For the information processing apparatus 1 of the first embodiment, the virtual machines 10A and 10B sends and receives communication data to and from each other via a communication debugger 30X described later. The communication debugger 30X, which serves as a communication logging unit, performs a logging operation of capturing communication data, and upon satisfaction of a predetermined condition, for example, analyzes a communication packet in the captured communication data. That is, the communication debugger 30X has a function as a logging unit that logs communication data between the virtual machines 10A and 10B, and a function as a communication debug unit that performs debugging. Note that the virtual machines 10A and 10B of the information processing apparatus 1 may send and receive directly to and from each other rather than through the communication debugger 30X if no logging of communication data is necessary.

In the first embodiment, processing performed by the communication debugger 30X on the communication data when a certain condition is satisfied is referred to as communication debugging. Examples of the communication debugging include communication packet analysis, communication packet replacement, communication control on a communication packet, communication packet storage, communication log storage, communication data retransmission, and communication packet processing.

The virtual machines 10A and 10B run on a hypervisor 40. The virtual machine 10A includes a guest OS 11A, which is an OS that runs on the virtual machine 10A. The virtual machine 10A also includes a virtual network card 12A for use in communication with the root OS 20. The virtual machine 10A further includes a response unit 151A that gives an answer, that is, an address in response to a request for an address, and a setting unit 152A that makes a setting on whether to allow the response unit 151A to send the address.

The setting unit 152A makes a response setting on whether to send the address of the virtual machine 10A in response to an address resolution protocol (ARP) request that is an address request from the virtual machine 10B to acquire the address. When the response setting made by the setting unit 152A is an inactive setting, the response unit 151A does not send the address of the virtual machine 10A even upon receiving an ARP request. When the response setting made by the setting unit 152A is an active setting, the response unit 151A sends the address of the virtual machine 10A upon receiving an ARP request. The setting unit 152A sets the response setting to the inactive setting for the ARP request, thereby restraining the response unit 151A from giving the answer, that is, the address in response to the ARP request. The response unit 151A switches the response setting between the active setting and the inactive setting in accordance with instruction data corresponding to the instruction input by the user.

The guest OS 11A includes an application 130A that performs processing such as various data diagnoses on the guest OS 11A, and a driver 140A that operates the virtual network card 12A. The application 130A is a functional part implemented by a software program that itself performs information processing requested by the user. The driver 140A is also a functional part implemented by a software program for operating the virtual network card 12A.

Upon receiving, from the driver 140A, data generated by the application 130A, the virtual network card 12A sends, to the root OS 20, the data generated by the application 130A. The virtual network card 12A also sends, to the driver 140A, data sent from the root OS 20.

The virtual machine 10B is configured similarly to the virtual machine 10A. That is, the virtual machine 10B includes a guest OS 11B that runs on the virtual machine 10B. The guest OS 11B has capabilities similar to the capabilities of the guest OS 11A. Specifically, the guest OS 11B includes an application 130B having capabilities similar to the capabilities of the application 130A, and a driver 140B having capabilities similar to the capabilities of the driver 140A.

The virtual machine 10B also includes a virtual network card 12B having capabilities similar to the capabilities of the virtual network card 12A. The virtual machine 10B further includes a response unit 151B having capabilities similar to the capabilities of the response unit 151A, and a setting unit 152B having capabilities similar to the capabilities of the setting unit 152A.

In the information processing apparatus 1, the virtual machine 10A sends data to the virtual machine 10B via the root OS 20. Also, in the information processing apparatus 1, the virtual machine 10B sends data to the virtual machine 10A via the root OS 20.

The data sent and received between the virtual machines 10A and 10B and the root OS 20 is an ARP request, an ARP response, or communication data. An ARP request is one example of address request. An address request is a request for acquiring the address corresponding to data that is to be sent. An ARP request, which specifies an IP address, is a request for acquiring an MAC address. An ARP response, which is a response to an ARP request, is sent from a device that has received this ARP request. An ARP response contains a destination address associated with the address request.

When the virtual machine 10A broadcasts an ARP request, this ARP request is transmitted to the root OS 20 and to the virtual machine 10B. Also, when the virtual machine 10B broadcasts an ARP request, this ARP request is transmitted to the root OS 20 and to the virtual machine 10A.

Upon receiving the ARP request from the virtual machine 10A, the root OS 20 sends an ARP response to the virtual machine 10A. Upon receiving the ARP request from the virtual machine 10B, the root OS 20 sends an ARP response to the virtual machine 10B.

In the present embodiment, where the virtual machine 10A sends communication data to the virtual machine 10B, this communication data undergoes information processing in the root OS 20, after which the communication data is sent from the root OS 20 to the virtual machine 10B. Similarly, where the virtual machine 10B sends communication data to the virtual machine 10A, this communication data undergoes information processing in the root OS 20, after which the communication data is sent from the root OS 20 to the virtual machine 10A.

The communication data sent from the root OS 20 to the virtual machine 10B is communication data generated by the virtual machine 10A, or communication data generated by the virtual machine 10A and processed by the root OS 20. Similarly, communication data sent from the root OS 20 to the virtual machine 10A is communication data generated by the virtual machine 10B, or communication data generated by the virtual machine 10B and processed by the root OS 20. Communication data sent and received between the virtual machines 10A and 10B and the root OS 20 includes a plurality of communication packets.

Note that processing of sending communication data from the virtual machine 10A to the virtual machine 10B via the root OS 20 is similar to processing of sending communication data from the virtual machine 10B to the virtual machine 10A via the root OS 20. Accordingly, the description below will be made as to an example in which communication data is sent from the virtual machine 10A to the virtual machine 10B via the root OS 20.

The root OS 20 includes the hypervisor 40 and the communication debugger 30X. The hypervisor 40 operates in parallel plural different OS's (operating systems), i.e., the guest OS's 11A and 11B. The communication debugger 30X performs communication debugging of the virtual machines 10A and 10B. The root OS 20 also includes a virtual network card 42 for use in communication between the hypervisor 40 and the communication debugger 30X, and a driver 43 that operates the virtual network card 42. The root OS 20 further includes a log storage unit 50 that stores a communication log.

The hypervisor 40 is a software program that creates the virtual machines 10A and 10B that each behave like hardware, and operates the guest OS's 11A and 11B. The hypervisor 40 runs on the root OS 20 to manage the virtual machines 10A and 10B. The hypervisor 40 includes a virtual switching hub 41 that relays information within the information processing apparatus 1.

The virtual switching hub 41 is connected to the virtual network cards 12A, 12B, and 42. The virtual switching hub 41 relays information sent and received in a network including the virtual machines 10A and 10B and the communication debugger 30X.

Specifically, the virtual switching hub 41 sends data sent from the virtual network cards 12A and 12B, to the virtual network card 42. The virtual switching hub 41 also sends data sent from the virtual network card 42, to one of the virtual network cards 12A and 12B. Thus, the hypervisor 40 sends data sent from the virtual machines 10A and 10B, to the root OS 20 via the virtual network card 42. In addition, the hypervisor 40 sends data sent from the root OS 20, to one of the virtual machines 10A and 10B.

The virtual network card 42 sends, to the driver 43, data sent from the hypervisor 40. The virtual network card 42 also sends, to the hypervisor 40, data sent from the driver 43. The hypervisor 40 sends an ARP response, an ARP request, or communication data to the communication debugger 30X. Meanwhile, the communication debugger 30X sends an ARP response or communication data to the hypervisor 40. The log storage unit 50 stores the communication log generated by the communication debugger 30X. The log storage unit 50 is connected to the host 2, and the host 2 can thus read the communication log stored in the log storage unit 50.

The communication debugger 30X is a software program that debugs the communication data between the virtual machines 10A and 10B on the basis of communication data sent from the virtual machines 10A and 10B. The communication debugger 30X runs on the root OS 20.

This communication debugger 30X includes a packet analysis unit 31, a log generation unit 32, and a packet processing unit 33. The packet analysis unit 31 analyzes a communication packet. The log generation unit 32 generates a communication log and a communication packet. The packet processing unit 33 processes the communication packet. The communication debugger 30X also includes a setting storage unit 34, a packet storage unit 35, and an ARP table storage unit 36. The setting storage unit 34 stores a specified condition for use in determination of whether to analyze a communication packet. The packet storage unit 35 stores a communication packet generated by the log generation unit 32. The ARP table storage unit 36 stores a fixed ARP table 300 (FIG. 3) described later herein. The fixed ARP table 300 is a table that shows correspondences between virtual IP addresses and MAC addresses.

The communication debugger 30X also includes a response unit 371X and a setting unit 372X. The response unit 371X gives an answer, that is, the address in response to a request for an address. The setting unit 372X makes a setting on whether to allow the response unit 371X to send the address.

The setting unit 372X makes a response setting on whether to send the address of the communication debugger 30X in response to an ARP request that is an address request from the virtual machine 10B to acquire the address. When the response setting made by the setting unit 372X is an inactive setting, the response unit 371X does not send the address of the communication debugger 30X even upon receiving an ARP request. When the response setting made by the setting unit 372X is an active setting, the response unit 371X sends the address of the communication debugger 30X upon receiving an ARP request. The setting unit 372X sets the response setting to the active setting for an ARP request, thereby allowing the response unit 371X to give the answer, that is, the address in response to the ARP request. The setting unit 372X switches the response setting between the active setting and the inactive setting in accordance with an instruction from the user.

In the communication debugger 30X, data sent from the driver 43 is sent to the packet analysis unit 31. In the communication debugger 30X, specifically, communication data addressed to the virtual machine 10B, which is sent from the virtual machine 10A, is sent to the packet analysis unit 31. In the communication debugger 30X, also, communication data addressed to the virtual machine 10A, which is sent from the virtual machine 10B, is sent to the packet analysis unit 31. In the communication debugger 30X, further, ARP requests sent from the virtual machines 10A and 10B are sent to the response unit 371X.

When data sent from the driver 43 is communication data, the packet analysis unit 31 compares the communication data with a user-set specified condition to check whether a communication packet of the communication data meets the specified condition. Specifically, the packet analysis unit 31 compares a communication packet in the communication data with the specified condition stored in the setting storage unit 34 to check whether that communication packet meets the specified condition. Thus, the packet analysis unit 31 analyzes whether a communication packet contained in the communication data sent from one of the virtual machines 10A and 10B meets the condition specified by the user.

When the communication packet in the communication data does not meet the specified condition, the packet analysis unit 31 sends the communication data directly to the virtual machine that is the destination of the communication data. When the communication packet that does not meet the specified condition is communication data from the virtual machine 10A to the virtual machine 10B, the packet analysis unit 31 sends the communication data to the virtual machine 10B. Similarly, when the communication packet that does not meet the specified condition is communication data from the virtual machine 10B to the virtual machine 10A, the packet analysis unit 31 sends the communication data to the virtual machine 10A. When the communication packet meets the specified condition, the packet analysis unit 31 sends that communication packet to the log generation unit 32.

The user-set specified condition relates to the content of the header of a communication packet, or to the type of communication protocol used in the virtual machine 10A. For example, when the communication packet is compliant with a predetermined protocol, the packet analysis unit 31 determines that this communication packet is a communication packet that should be analyzed. Alternatively, the user-set specified condition may be the content of the data part of a communication packet. That is, when the specified condition is the content of the header of a communication packet, a data string (e.g., data string consisting of "1010") contained in the header of a communication packet is set as the specified condition. Note that the user-set specified condition may be any condition.

The log generation unit 32 stores, in the packet storage unit 35, the communication packet sent from the packet analysis unit 31. The log generation unit 32 sends, to the packet processing unit 33, the communication packet sent from the packet analysis unit 31. Also, the log generation unit 32 generates a communication log on the basis of the communication packet sent from the packet analysis unit 31. Thus, the log generation unit 32 generates a communication log of the communication data when the communication packet meets the specified condition. The log generation unit 32 also stores the generated communication log in the log storage unit 50.

The packet analysis unit 31 analyzes data sent from the driver 43. Upon receiving an ARP request from the driver 43 with the response setting being set to the active setting, the response unit 371X sends, to the driver 43, an ARP response having a media access control (MAC) address of the communication debugger 30X added thereto. Alternatively, upon receiving an ARP request from the driver 43 with the response setting being set to the inactive setting, the response unit 371X sends no ARP response.

The packet processing unit 33 replaces the communication packet, sent from the log generation unit 32, with specified data. In other words, a communication packet that meets a replacement condition for the communication packet is replaced with specified data by the packet processing unit 33. Specifically, the packet processing unit 33 replaces a particular data portion or a particular field in the communication packet with specified data. This enables data in the communication packet to be replaced with operation verification data. The operation verification data is sent to the virtual machines 10A and 10B and the virtual machines 10A and 10B run using the sent operation verification data, such that operations of the virtual machines 10A and 10B can be easily verified. A replacement condition is a condition for replacement of a communication packet, and is set by the user.

The packet processing unit 33 sets the destination of a communication packet in accordance with the fixed ARP table 300 stored in the ARP table storage unit 36 as described later. The packet processing unit 33 sets the virtual machine 10B as the destination of a communication packet addressed to the virtual machine 10B and sent from the virtual machine 10A. The packet processing unit 33 sets the virtual machine 10A as the destination of a communication packet addressed to the virtual machine 10A and sent from the virtual machine 10B. The packet processing unit 33 sends, to the driver 43, communication data containing the communication packet to which a destination has been set. As described above, the packet processing unit 33 generates communication data using a communication packet, and sends the generated communication data to the driver 43.

When the communication packet meets a sending change condition, the packet processing unit 33 stops sending the communication data, restarts sending the communication data, or skips sending the communication data. A sending change condition is a condition for changing communication processing, and is set by the user. One example of the sending change condition is an elapsed time since the communication debugger 30X has received the communication data. In this case, upon a lapse of the time set as the sending change condition since the communication debugger 30X has received the communication data, the packet processing unit 33 stops sending the communication data, restarts sending the communication data, or skips sending the communication data.

Upon satisfaction of a sending change condition corresponding to the sending stop, the packet processing unit 33 stops sending the communication data. Upon satisfaction of a sending change condition corresponding to the sending restart, the packet processing unit 33 restarts sending the communication data. Upon satisfaction of a sending change condition corresponding to the sending skip, the packet processing unit 33 skips sending the communication data.

Note that the sending change condition may be the content of the header of a communication packet. In this case, the sending change condition is a data string (e.g., data string consisting of "0101") contained in the header of the communication packet. When a data string contained in the header matches the data string that is set as the sending change condition, the packet processing unit 33 stops sending the communication data, restarts sending the communication data, or skips sending the communication data. When a data string corresponding to the sending stop is contained in the header, the packet processing unit 33 stops sending the communication data. If a data string corresponding to the sending restart is contained in the header, the packet processing unit 33 restarts sending the communication data. If a data string corresponding to the sending skip is contained in the header, the packet processing unit 33 skips sending the communication data.

In addition, the packet processing unit 33 sends a communication packet stored in the packet storage unit 35 to an appropriate one of the virtual machines 10A and 10B at arbitrary timing. The packet processing unit 33 sends a communication packet stored in the packet storage unit 35 to an appropriate one of the virtual machines 10A and 10B at sending re-performance timing. The sending re-performance timing is timing at which to retransmit communication data, and is set by an user per type of communication data.

In addition, when the communication packet meets the specified condition and the replacement condition, the packet processing unit 33 replaces data in the communication packet with data specified by the user via the host 2.

That is, in reproducing a past communication, the packet processing unit 33 of the first embodiment replaces the communication packet with a past communication packet stored in the packet storage unit 35, such that the packet processing unit 33 can retransmit the past communication data without operations of the applications 130A and 130B on the virtual machines 10A and 10B.

The setting storage unit 34 is connected to the packet analysis unit 31 and to the host 2. The setting storage unit 34 stores a sending change condition used by the packet analysis unit 31. Note that the sending change condition, the replacement condition, and the sending re-performance timing referred to by the packet processing unit 33 may be stored in any area. The sending change condition, the replacement condition, or the sending re-performance timing may be stored in the setting storage unit 34 or in an area other than the setting storage unit 34.

The packet storage unit 35 is connected to the log generation unit 32 and to the packet processing unit 33. The packet storage unit 35 stores a communication packet generated by the log generation unit 32. The packet storage unit 35 stores the communication packet when the communication packet meets the specified condition.

Figure 3:
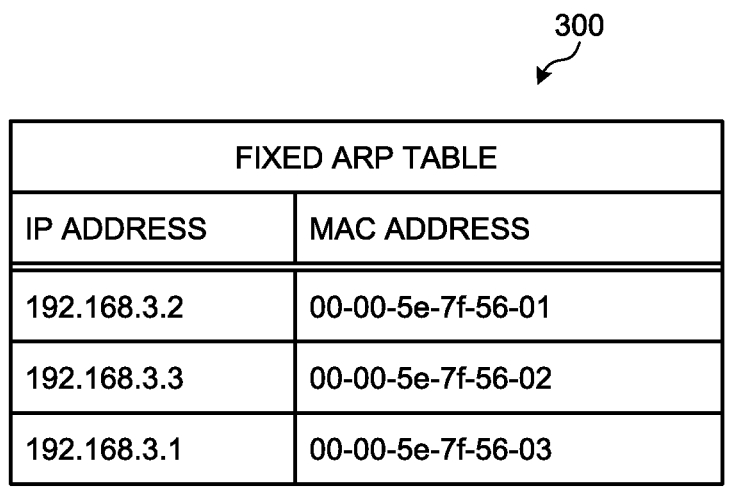
FIG. 3 is a diagram illustrating a structure of a fixed address resolution protocol (ARP) table according to the first embodiment.

The ARP table storage unit 36 stores the fixed ARP table 300 used by the packet processing unit 33. As illustrated in FIG. 3, the fixed ARP table 300 is a table that provides relationships between IP addresses and MAC addresses in a virtual local area network (LAN) including the virtual machines 10A and 10B. The fixed ARP table 300 stores correspondences between IP addresses and MAC addresses of the virtual machines 10A and 10B and the communication debugger 30X.

The communication debugger 30X is connected to the host 2. Specifically, the setting storage unit 34 of the communication debugger 30X is connected to the host 2. When the specified condition is to be changed in accordance with an instruction from the user, the host 2 rewrites the sending change condition in the setting storage unit 34. In addition, when a communication log is needed, the host 2 reads a communication log from the log storage unit 50. Furthermore, when the sending change condition, the replacement condition, or the sending re-performance timing is to be changed in accordance with an instruction from the user, the host 2 accesses the communication debugger 30X, and then changes accordingly the sending change condition, the replacement condition, or the sending re-performance timing.

Thus, when a communication packet contained in the communication data from one of the virtual machines 10A and 10B meets the specified condition, the communication debugger 30X of the first embodiment performs various processing on the communication data from one of the virtual machines 10A and 10B. The functions of the logging unit included in the communication debugger 30X are implemented using, for example, a combination of the packet analysis unit 31, the log generation unit 32, and the packet processing unit 33. The functions of the logging unit included in the communication debugger 30X may be implemented using any one of the elements included in the communication debugger 30X. In addition, the functions of the communication debug unit included in the communication debugger 30X are implemented using, for example, the packet analysis unit 31, the log generation unit 32, and the packet processing unit 33. The functions of the communication debug unit included in the communication debugger 30X may be implemented using any one of the elements included in the communication debugger 30X.

The number of the virtual machines residing on the virtual platform 10 is not limited to two for the virtual machines 10A and 10B, but may be three or more. Moreover, the location of the setting storage unit 34, the packet storage unit 35, or the ARP table storage unit 36 is not limited to a location inside the communication debugger 30X, but may be a location outside the communication debugger 30X.

Figure 2:
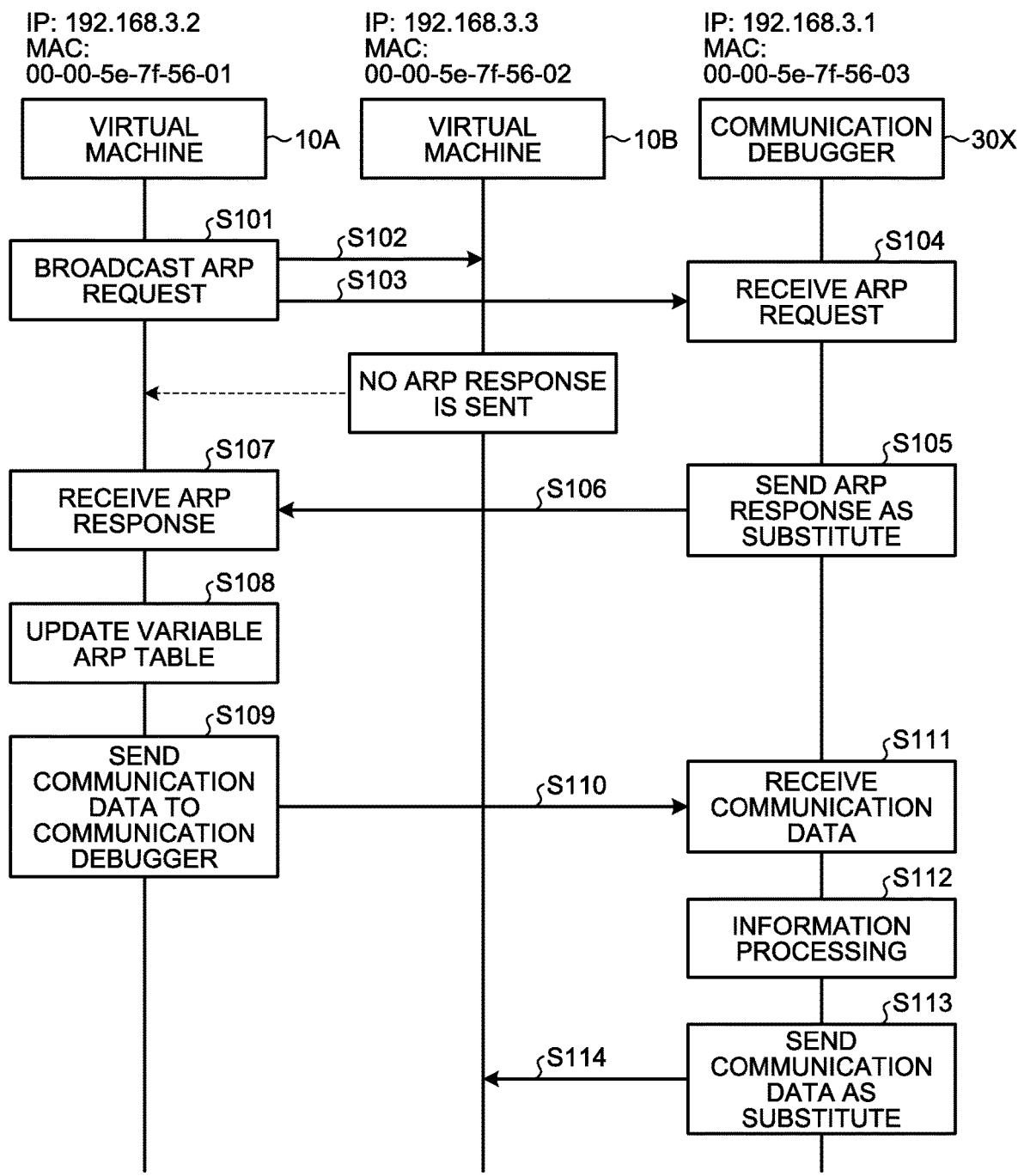
FIG. 2 is a sequence chart illustrating a processing procedure for sending/receiving data according to the first embodiment.

A processing procedure for sending/receiving communication data in the information processing apparatus 1 will next be described. FIG. 2 is a sequence chart illustrating a processing procedure for sending/receiving data according to the first embodiment. In the information processing apparatus 1 of the first embodiment, the virtual machines 10A and 10B communicate with each other via the communication debugger 30X. The assumption is that the virtual machine 10A has, for example, an IP address of 192.168.3.2 and a MAC address of 00-00-5e-7f-56-01; and that the virtual machine 10B has, for example, an IP address of 192.168.3.3 and a MAC address of 00-00-5e-7f-56-02. The assumption is that the communication debugger 30X has, for example, an IP address of 192.168.3.1 and a MAC address of 00-00-5e-7f-56-03.

The virtual machine 10A communicates with the virtual machine 10B. In this operation, the virtual machine 10A broadcasts an ARP request, at step S101, to identify the MAC address of the virtual machine 10B.

The virtual machine 10A adds the IP address of the virtual machine 10B, i.e., 192.168.3.3 to the ARP request that is to be broadcast. The ARP request from the virtual machine 10A is sent to the virtual machine 10B and to the communication debugger 30X via the hypervisor 40. That is, the ARP request is sent from the virtual machine 10A to the virtual machine 10B at step S102, and the ARP request is sent from the virtual machine 10A to the communication debugger 30X at step S103.

The virtual machine 10B receives the ARP request from the virtual machine 10A, and at step S104, the communication debugger 30X receives the ARP request from the virtual machine 10A. The first embodiment is based on the assumption that the setting unit 152B of the virtual machine 10B sets the response setting to the inactive setting. Thus, even upon receiving the ARP request from the virtual machine 10A, the virtual machine 10B does not send an ARP response.

The first embodiment is based on the assumption that the setting unit 372X of the communication debugger 30X sets the response setting to the active setting. Thus, upon receiving the ARP request, at step S105, the response unit 371X of the communication debugger 30X sends, as a substitute, an ARP response to the virtual machine 10A on behalf of the virtual machine 10B. This ARP response contains the address of the communication debugger 30X set as a destination address.

Thus, the virtual machine 10B is set not to respond to an ARP request, and therefore, the communication debugger 30X, which substitutes for the virtual machine 10B, responds to the ARP request. The ARP response sent from the communication debugger 30X to the virtual machine 10A has the MAC address of the communication debugger 30X, i.e., 00-00-5e-7f-56-03 added thereto. At step S106, the ARP response from the communication debugger 30X is sent to the virtual machine 10A via the hypervisor 40.

At step S107, the virtual machine 10A receives the ARP response from the communication debugger 30X. At step S108, on the basis of the ARP response, the virtual machine 10A updates a variable ARP table similar in structure to the fixed ARP table 300. The variable ARP table updated by the virtual machine 10A is dynamically modified by the virtual machine 10A in accordance with the MAC address contained in the ARP response. The ARP response received by the virtual machine 10A of the first embodiment contains the MAC address of the communication debugger 30X. Therefore, the virtual machine 10A associates the IP address in the ARP request, i.e., 192.168.3.3 with the MAC address in the ARP response, i.e., 00-00-5e-7f-56-03, in the variable ARP table. As a result, the IP address of the virtual machine 10B is associated with the MAC address of the communication debugger 30X in the variable ARP table.

Then, the virtual machine 10A takes the MAC address of the communication debugger 30X as the MAC address of the virtual machine 10B, such that, at step S109, the virtual machine 10A sends, to the communication debugger 30X, the communication data due to be sent to the virtual machine 10B. Thus, at step S110, the communication data, which is first communication data, is sent to the communication debugger 30X. At step S111, the communication debugger 30X receives the communication data addressed to the virtual machine 10B. At step S112, the communication debugger 30X performs various information processing on the communication data. Specifically, the communication debugger 30X performs packet analysis on the communication data, stores the communication log, and processes the communication packet.

Consulting the fixed ARP table 300, at step S113, the communication debugger 30X then sends, to the virtual machine 10B on behalf of the virtual machine 10A, the communication data addressed to the virtual machine 10B and received from the virtual machine 10A. Thus, at step S114, the communication data, which is second communication data, is sent from the communication debugger 30X to the virtual machine 10B. The virtual machine 10B then receives the communication data.

A structure of the fixed ARP table 300 will next be described. FIG. 3 is a diagram illustrating a structure of the fixed ARP table according to the first embodiment. In the fixed ARP table 300, IP addresses is associated with respective MAC addresses.

In the fixed ARP table 300 in the first embodiment, the IP address of the virtual machine 10A, i.e., 192.168.3.2 is associated with the MAC address of the virtual machine 10A, i.e., 00-00-5e-7f-56-01. In the fixed ARP table 300, also, the IP address of the virtual machine 10B, i.e., 192.168.3.3 is associated with the MAC address of the virtual machine 10B, i.e., 00-00-5e-7f-56-02. In the fixed ARP table 300, further, the IP address of the communication debugger 30X, i.e., 192.168.3.1 is associated with the MAC address of the communication debugger 30X, i.e., 00-00-5e-7f-56-03.

The above structure of the fixed ARP table 300 allows the packet processing unit 33 of the communication debugger 30X to extract the MAC address associated with the destination IP address from the fixed ARP table 300 in sending communication data. The packet processing unit 33 then sends communication data to the extracted MAC address. This enables the packet processing unit 33 to send communication data to one of the virtual machines 10A and 10B that has the destination IP address.

Note that the variable ARP table is similar in structure to the fixed ARP table 300. In the first embodiment, on the basis of the ARP response from the communication debugger 30X, the virtual machine 10A associates the IP address of the virtual machine 10B with the MAC address of the communication debugger 30X in the variable ARP table. In sending communication data to the virtual machine 10B, the virtual machine 10A extracts the MAC address associated with the IP address of the virtual machine 10B. This MAC address extracted by the virtual machine 10A is the MAC address of the communication debugger 30X. The virtual machine 10A then sends the communication data to the extracted MAC address. This enables the virtual machine 10A to send communication data addressed to the virtual machine 10B, to the communication debugger 30X.

Figure 4:
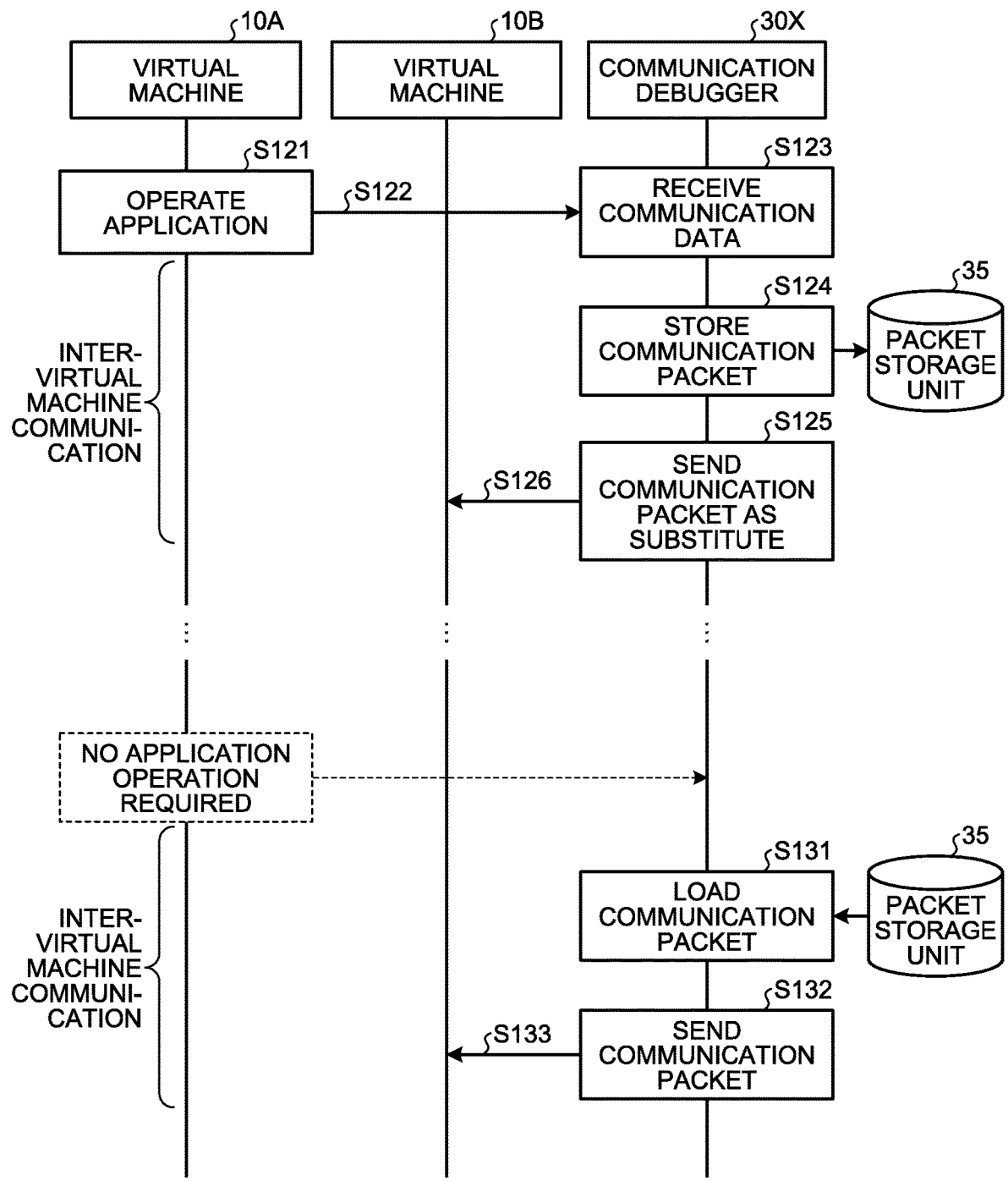
FIG. 4 is a sequence chart illustrating a processing procedure for transmitting packets according to the first embodiment.

A processing procedure for sending a communication packet stored in the communication debugger 30X will next be described. FIG. 4 is a sequence chart illustrating a processing procedure for transmitting packets according to the first embodiment. At step S121, the virtual machine 10A operates the application 130A to thereby send communication data addressed to the virtual machine 10B, to the communication debugger 30X at step S122.

As a result, the communication debugger 30X receives the communication data addressed to the virtual machine 10B at step S123, and stores the communication packet of the received communication data in the packet storage unit 35 at step S124. In addition, at step S125, the communication debugger 30X generates communication data, using the communication packet having been stored, and sends, as a substitute, the communication packet on behalf of the virtual machine 10A.

Thus, at step S126, the communication data from the communication debugger 30X is sent to the virtual machine 10B, and the virtual machine 10B then receives the communication data from the communication debugger 30X. This communication data received by the virtual machine 10B corresponds to the communication data from the virtual machine 10A. The process in steps S121 to S126 described above achieves inter-virtual machine communication, i.e., communication from the virtual machine 10A to the virtual machine 10B.

When the communication debugger 30X sends, to the virtual machine 10B, a communication packet having been stored in the communication debugger 30X, the virtual machines 10A and 10B do not operate the applications 130A and 130B. In other words, when the communication debugger 30X sends, to the virtual machine 10B, a communication packet having been stored, there is no need to operate the applications 130A and 130B. The communication debugger 30X loads the communication packet stored in the packet storage unit 35 at sending re-performance timing at step S131, and generates, at step S132, communication data, using the loaded communication packet, to send the generated communication data to the virtual machine 10B.

Thus, at step S133, the communication data from the communication debugger 30X is sent to the virtual machine 10B, and the virtual machine 10B then receives the communication data from the communication debugger 30X. This communication data received by the virtual machine 10B corresponds to the communication data from the virtual machine 10A. The process in steps S131 to S133 described above reproduces inter-virtual machine communication, i.e., communication from the virtual machine 10A to the virtual machine 10B.

Figure 5:
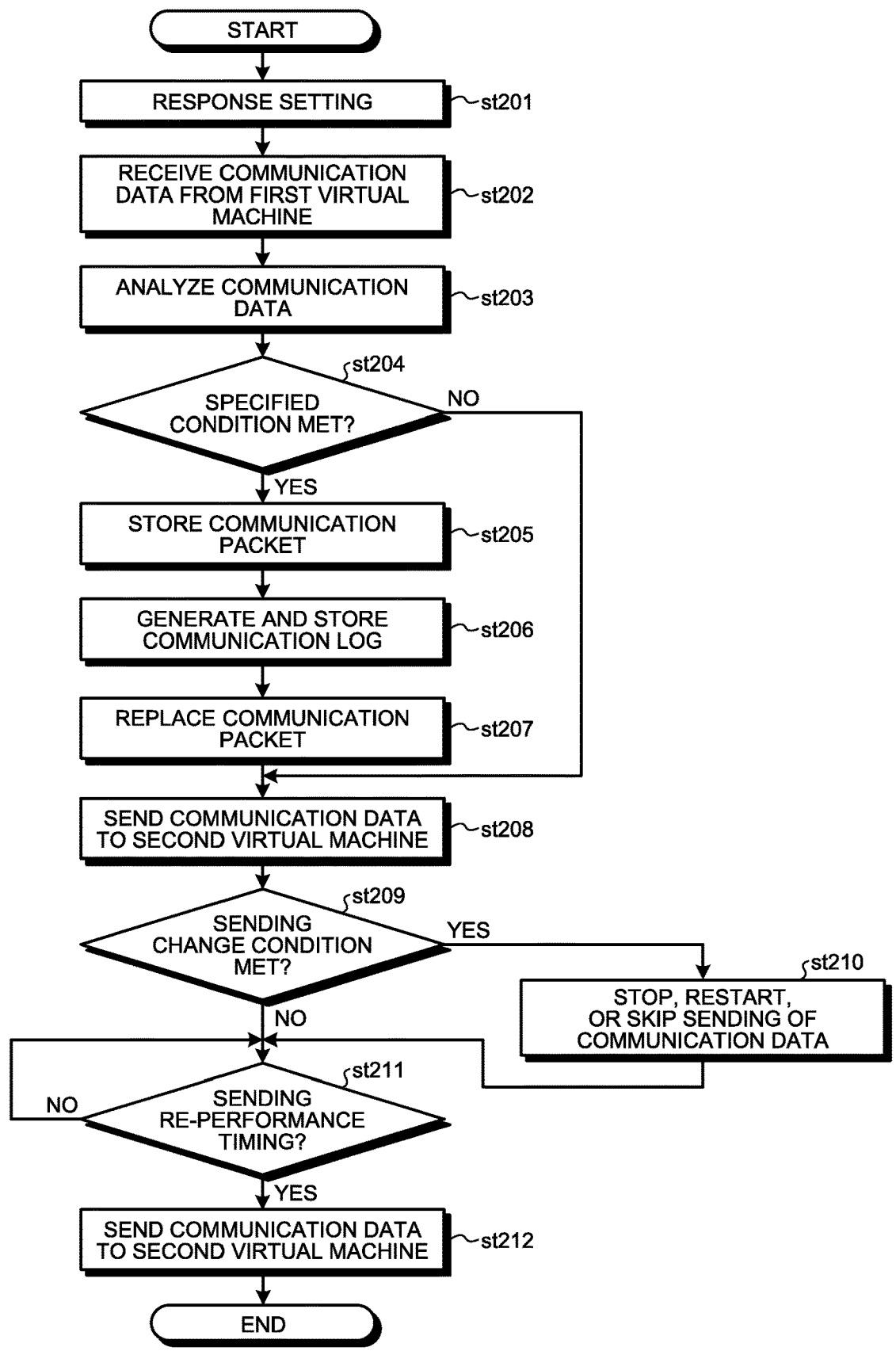
FIG. 5 is a flowchart illustrating an operation processing procedure of a communication debugger according to the first embodiment.

An operation processing procedure of the communication debugger 30X will next be described. FIG. 5 is a flowchart illustrating an operation processing procedure of the communication debugger according to the first embodiment. The description given below is based on the assumption that the communication debugger 30X receives communication data from the virtual machine 10A to the virtual machine 10B.

At step st201, the setting unit 372X of the communication debugger 30X performs response setting. In particular, the setting unit 372X sets the response setting to the active setting in accordance with a user instruction from the host 2. In addition, the setting unit 152A of the virtual machine 10A sets the response setting to the inactive setting in accordance with the user instruction from the host 2, and the setting unit 152B of the virtual machine 10B sets the response setting to the inactive setting in accordance with the user instruction from the host 2.

When an ARP request is sent from the virtual machine 10A to the communication debugger 30X with those settings being made, the communication debugger 30X sends an ARP response to the virtual machine 10A. Thus, the communication data from the virtual machine 10A is sent to the communication debugger 30X.

Then, at step st202, the packet analysis unit 31 receives communication data from the virtual machine 10A, which is a first virtual machine. At step st203, the packet analysis unit 31 analyzes the communication data. At step st204, the packet analysis unit 31 compares the communication packet in the communication data with the user-set specified condition to check whether the communication packet in the communication data meets the specified condition.

When a data string contained in the communication packet of the communication data matches the data string that is set as the specified condition, that is, for Yes at step st204, the packet analysis unit 31 sends the communication packet to the log generation unit 32.

Then, at step st205, the log generation unit 32 stores the communication packet of the communication data in the packet storage unit 35. At step st206, the log generation unit 32 generates a communication log of the communication data, and stores the generated communication log in the log storage unit 50. Note that the log generation unit 32 may first perform any one of steps st205 and 206, or may simultaneously perform steps st205 and 206.

In addition, the log generation unit 32 transfers, to the packet processing unit 33, the communication packet sent from the packet analysis unit 31. Note that the log generation unit 32 may first perform any one of the processing for sending the communication packet to the packet processing unit 33 and steps st205 and st206, or may simultaneously perform that processing and steps st205 and 206.

At step st207, the packet processing unit 33 replaces a communication packet that meets the replacement condition, with specified data. On the basis of the fixed ARP table 300 stored in the ARP table storage unit 36, the packet processing unit 33 sets a destination to which the communication data is sent. The packet processing unit 33 described in this example sets this destination to which the communication data is sent, to the virtual machine 10B. Then, at step st208, the packet processing unit 33 sends the communication data to the virtual machine 10B, which is a second virtual machine.

Alternatively, when, at step st204, no data string contained in the packet of the communication data matches the data string that is set as the specified condition, that is, for No at step st204, the packet analysis unit 31 sends the communication data to the virtual machine 10B, which is a second virtual machine, at step st208.

At step st209 following step st208, the packet processing unit 33 determines whether the communication packet meets the sending change condition. When the communication packet meets the sending change condition, that is, for Yes at step st209, the packet processing unit 33 stops sending the communication data, restarts sending the communication data, or skips sending the communication data at step st210. That is, when the communication packet meets a sending change condition indicative of the sending stop, the packet processing unit 33 stops sending the communication data. When the communication packet meets a sending change condition indicative of the sending restart, the packet processing unit 33 restarts sending the communication data. When the communication packet meets a sending change condition indicative of the sending skip, the packet processing unit 33 skips sending the communication data.

After stopping sending the communication data, restarting sending the communication data, or skipping sending the communication data, the packet processing unit 33 monitors whether a time is the sending re-performance timing at step st211. Also, when, at step st209, the communication packet does not meet the sending change condition, that is, for No at step st209, the packet processing unit 33 monitors whether the time is the sending re-performance timing at step st211.

When the time is not the sending re-performance timing, that is, for No at step st211, the packet processing unit 33 suspends sending of the communication data to the virtual machine 10B until the sending re-performance timing. Then, at step st211, the packet processing unit 33 continues monitoring whether the time is the sending re-performance timing.

At the sending re-performance timing, that is, for Yes at step st211, the packet processing unit 33 generates communication data, using the communication packet stored in the packet storage unit 35 at step st212, and sends the generated communication data to the virtual machine 10B, which is the second virtual machine. Note that, at step st203, the packet analysis unit 31 may analyze the communication data, using the fixed ARP table 300 stored in the ARP table storage unit 36. In this case, at step st204, on the basis of the fixed ARP table 300, the packet analysis unit 31 may check whether the communication packet in the communication data meets the specified condition.

Figure 6:
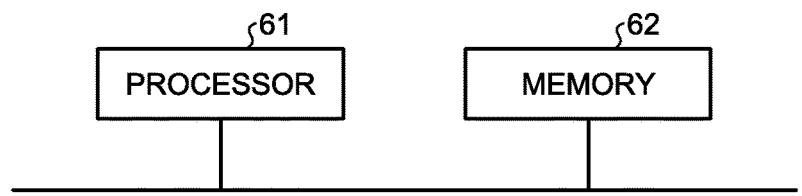
FIG. 6 is a diagram illustrating a hardware configuration of the communication debugger according to the first embodiment.

The functions of the elements included in the communication debugger 30X of the first embodiment may be implemented in a processor 61 described later. FIG. 6 is a diagram illustrating a hardware configuration of the communication debugger according to the first embodiment.

The functions of the packet analysis unit 31, the log generation unit 32, the packet processing unit 33, the response unit 371X, and the setting unit 372X in the communication debugger 30X are implemented in a processing circuit. That is, the communication debugger 30X includes a processing circuit that sends an ARP response, analyzes a packet, generates a log, and processes the packet to thereby perform communication debugging. The processing circuit is a processor (also referred to as central processing unit (CPU), central processing unit, processing unit, computing unit, microprocessor, microcomputer, or digital signal processor (DSP)) 61 that executes a program stored in a memory 62.

The functions of the packet analysis unit 31, the log generation unit 32, the packet processing unit 33, the response unit 371X, and the setting unit 372X may be implemented in software or firmware, or in a combination of software and firmware. The software or firmware is described as a program, and is stored in the memory 62. The processing circuit reads and executes a program stored in the memory 62 to implement the function of each of the elements. That is, the communication debugger 30X includes the memory 62 that is a non-transitory computer-readable recording medium having programs recorded thereon for causing a computer to perform the step of analyzing a packet, the step of generating a log, and the step of processing the packet. In other words, these programs can cause a computer to perform a procedure or method carried out by the packet analysis unit 31, the log generation unit 32, and the packet processing unit 33.

Thus, the set of programs executed by the processor 61 is a computer program product stored in a non-transitory computer-readable recording medium, including plural computer-executable instructions for performing communication debugging. The set of programs executed by the processor 61 includes plural instructions that cause a computer to perform communication debugging.

In this regard, the memory 62 is, for example, a non-volatile or volatile semiconductor memory, such as a random access memory (RAM), a read-only memory (ROM), a flash memory, an erasable programmable ROM (EPROM), or an electrically erasable programmable ROM (EEPROM); or a magnetic disk, a flexible disk, an optical disk, a compact disc, a MiniDisc, or a digital versatile disc (DVD).

As described above, in the information processing apparatus 1, the setting unit 152B of the virtual machine 10B sets the response setting to the inactive setting while the setting unit 372X of the communication debugger 30X sets the response setting to the active setting, such that communication data between the virtual machines 10A and 10B can be made to pass through the communication debugger 30X. In addition, the information processing apparatus 1 is implemented using the existing Internet protocol. For this reason, the information processing apparatus 1 can provide a simple configuration capable of debugging communication data without using particular hardware. Moreover, in the information processing apparatus 1, the hypervisor 40, which serves as the virtual control unit, in itself is not required to relay information directly between the virtual machines 10A and 10B. That is, the information processing apparatus 1 has a function to make communication data pass through the communication debugger 30X. That is, the information processing apparatus 1 is arranged such that the communication debugger 30X keeps the virtual machines 10A and 10B from sending ARP responses, and on behalf of the virtual machines 10A and 10B, gives the answer, that is, the address of the communication debugger 30X. In the information processing apparatus 1, thus, information between the virtual machines 10A and 10B is made to pass through the communication debugger 30X. For the information processing apparatus 1, furthermore, there is no need to directly abstract access memory areas provided by the virtual machines 10A and 10B. This can reduce cost for providing debugging, and reduce the difficulty of implementation of a debug program. In addition, there is no need to access memory areas in the virtual machines 10A and 10B from the outside, thereby enabling debugging to be performed by using an OS-provided configuration change function.

The communication debugger 30X analyzes a communication packet, and stores a communication packet meeting the specified condition as a part of a communication log, thereby enabling storage of a necessary communication packet. Thus, the log storage unit 50 can have a reduced storage capacity, which is the disk capacity of the information processing apparatus 1, and improved readability of the communication log is provided.

The communication debugger 30X also analyzes a communication packet, and rewrites the communication packet, using user-specified data. This enables the communication debugger 30X to change communication data without operating debug programs on the virtual machines 10A and 10B, and thus facilitates debugging. This operation also enables the communication debugger 30X to readily rewrite the content of communication data, and to easily provide control such as stopping sending of, restarting sending of, and skipping sending of, communication data. A reduction in the cost of constructing a debug environment can also be achieved.

The communication debugger 30X sends a communication packet stored, to one of the virtual machines 10A and 10B at arbitrary timing. This enables the information processing apparatus 1 to readily reproduce a past communication without operations of the applications 130A and 130B on the virtual machines 10A and 10B.

Thus, in the first embodiment, the virtual machine 10B does not respond to the ARP request from the virtual machine 10A, but the communication debugger 30X sends an ARP response to the virtual machine 10A, thereby enabling communication data between the virtual machines 10A and 10B to pass through the communication debugger 30X. Thus, logging of information between the virtual machines 10A and 10B can be achieved by a simple configuration, and debugging of content of communication between the virtual machines 10A and 10B can be achieved by a simple configuration.

The information processing apparatus 1 includes the plural virtual machines 10A and 10B, and the communication debugger 30X connected to the plural virtual machines 10A and 10B, such that the communication debugger 30X can easily debug communication data between the virtual machines 10A and 10B.

The communication debugger 30X, which performs debugging of communication data when a communication packet contained in the communication data meets the specified condition from the user, can thus easily debug desired communication data.

The communication debugger 30X, which generates and stores a communication log of communication data when a communication packet meets the specified condition, can thus store a desired communication log. This can reduce the storage capacity of the log storage unit 50.

The communication debugger 30X, which stores a communication packet when the communication packet meets the specified condition, can thus store a desired packet. This can reduce the storage capacity of the packet storage unit 35.

The communication debugger 30X, which replaces data in a communication packet with user-specified data when the communication packet meets the specifying condition, can thus replace data in a desired communication packet with desired data.

The communication debugger 30X generates communication data from a communication packet stored in the packet storage unit 35, sends the generated communication data to the virtual machine 10B, and can thus readily retransmit desired communication data. In addition, the communication debugger 30X resides on the root OS 20, thereby achieving a simple configuration of the information processing apparatus 1.

Second Embodiment

A second embodiment will next be described with reference to FIG. 7. In the second embodiment, a communication debugger 30Y described later herein instructs the virtual machines 10A and 10B to cause the setting units 152A and 152B to each make a response setting.

Figure 7:
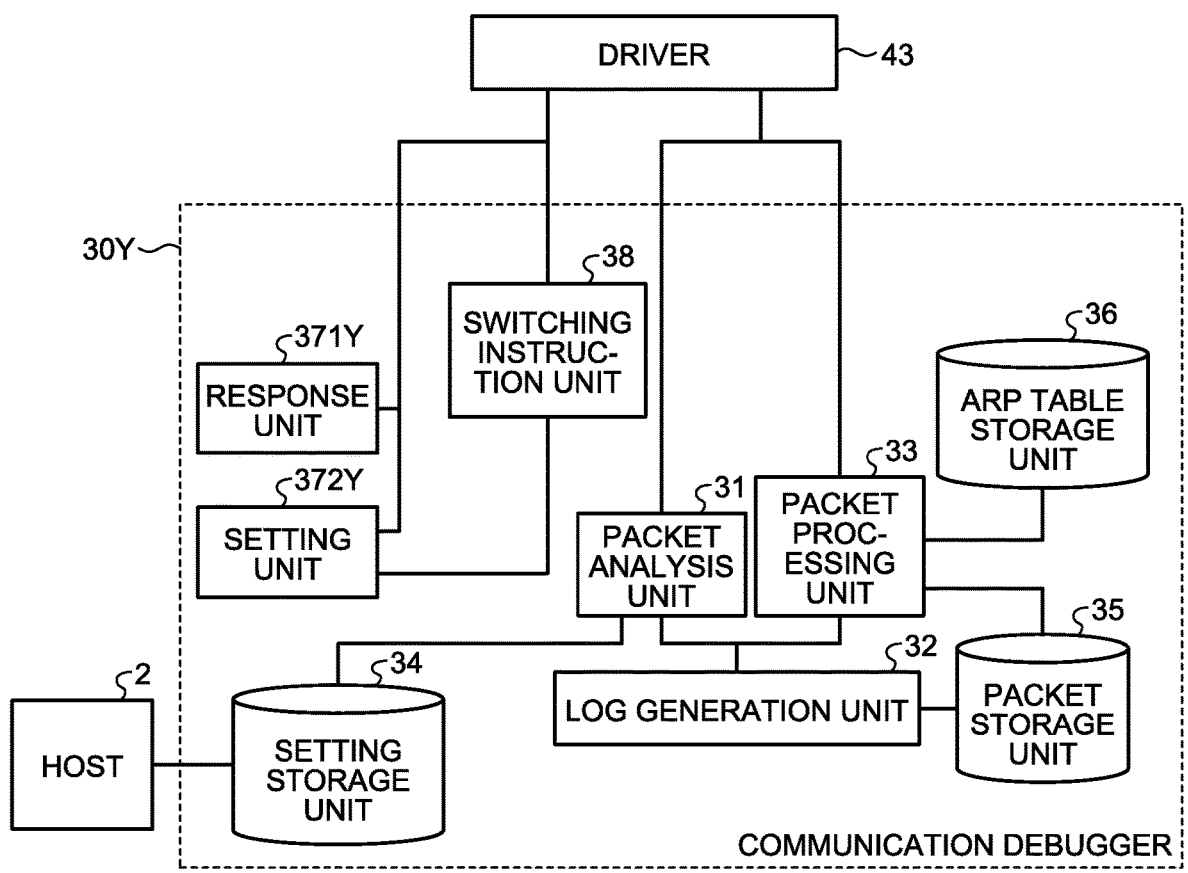
FIG. 7 is a diagram illustrating a functional configuration of a communication debugger according to a second embodiment.

FIG. 7 is a diagram illustrating a functional configuration of a communication debugger according to the second embodiment. Of the elements in FIG. 7, elements having functions identical or similar to the functions of the communication debugger 30X of the first embodiment illustrated in FIG. 1 are designated by like reference characters, and duplicate description is omitted. Note that the communication debugger 30Y according to the second embodiment has a hardware configuration similar to the hardware configuration of the communication debugger 30X.

Similarly to the communication debugger 30X, the communication debugger 30Y is a software program that supports fixing of a bug or a defect of communication performed by the virtual machines 10A and 10B. The communication debugger 30Y is provided in a position similar to the position of the communication debugger 30X in the information processing apparatus 1 illustrated in FIG. 1.

In addition to the elements included in the communication debugger 30X, the communication debugger 30Y includes a switching instruction unit 38 that switches the response settings made by the setting units 152A and 152B of the virtual machines 10A and 10B to an active setting or an inactive setting.

In accordance with a user instruction, the switching instruction unit 38 instructs the setting units 152A and 152B to each make a response setting. The switching instruction unit 38 also instructs the setting unit 372Y of the communication debugger 30Y to make a response setting. The setting unit 372Y has capabilities similar to the capabilities of the setting unit 372X, and the response unit 371Y has capabilities similar to the capabilities of the response unit 371X.

In the description given below, switching of the response settings in the virtual machines 10A and 10B may also be referred to as machine switching, and switching of the response setting in the communication debugger 30Y may also be referred to as debugger switching.

The switching instruction unit 38 is connected to the driver 43, and sends, to the driver 43, a first switching instruction, which is a switching instruction on machine switching, in performing the machine switching in the virtual machines 10A and 10B. This first switching instruction is an instruction specifying whether the setting units 152A and 152B set the response setting to the active setting or the inactive setting.

When the switching instruction unit 38 sends the first switching instruction to the driver 43, the first switching instruction is sent to one or both of the virtual machines 10A and 10B. Note that the switching instruction unit 38 may send the first switching instruction to both of the virtual machines 10A and 10B, or to one of the virtual machines 10A and 10B.

The switching instruction unit 38 is also connected to the setting unit 372Y, and sends, to the setting unit 372Y, a second switching instruction, which is a switching instruction on debugger switching, in performing machine switching in the communication debugger 30Y. This second switching instruction is an instruction specifying whether the setting unit 372Y sets the response setting to the active setting or the inactive setting. When the switching instruction unit 38 sends the second switching instruction to the setting unit 372Y, the setting unit 372Y sets the response setting to the active setting or the inactive setting in accordance with the second switching instruction.

When the switching instruction unit 38 provides the virtual machines 10A and 10B with an instruction for the active setting, the switching instruction unit 38 provides the setting unit 372Y with an instruction for the inactive setting. Thus, in a case in which the setting unit 152B of the virtual machine 10B has set the response setting to the active setting, the virtual machine 10B sends an ARP response to the virtual machine 10A in response to an ARP request from the virtual machine 10A, while the communication debugger 30Y does not send an ARP response. Similarly, in a case in which the setting unit 152A of the virtual machine 10A has set the response setting to the active setting, the virtual machine 10A sends an ARP response to the virtual machine 10B in response to an ARP request from the virtual machine 10B, while the communication debugger 30Y does not send an ARP response.

Alternatively, when the switching instruction unit 38 provides the virtual machines 10A and 10B with an instruction for the inactive setting, the switching instruction unit 38 instructs the setting unit 372Y to set the response setting to the active setting. Thus, in a case in which the response unit 371Y sends an ARP response to the virtual machine 10A in response to an ARP request from the virtual machine 10A, the virtual machine 10B does not send an ARP response. Similarly, in a case in which the response unit 371Y sends an ARP response to the virtual machine 10B in response to an ARP request from the virtual machine 10B, the virtual machine 10A does not send an ARP response. Thus, machine switchings in the virtual machines 10A and 10B are performed in conjunction with debugger switching in the communication debugger 30Y.

The setting units 152A and 152B of the virtual machines 10A and 10B may otherwise detect debugger switching in the communication debugger 30Y, and then perform machine switchings on the basis of the detection result. Also, the setting unit 372Y of the communication debugger 30Y may detect machine switchings in the virtual machines 10A and 10B, and then perform debugger switching on the basis of the detection result. This operation will eliminate the need for the switching instruction unit 38 of the communication debugger 30Y.

The response units 151A and 151B of the virtual machines 10A and 10B may also notify the setting unit 372Y of the communication debugger 30Y, of the status of machine switching. In this case, the setting unit 372Y performs debugger switching in accordance with the notification information from the response units 151A and 151B. This operation will also eliminate the need for the switching instruction unit 38 of the communication debugger 30Y.

The virtual machines 10A and 10B may otherwise perform machine switchings independently of the communication debugger 30Y. The communication debugger 30Y may also perform debugger switching independently of the virtual machines 10A and 10B. In other words, machine switchings performed by the virtual machines 10A and 10B and debugger switching performed by the communication debugger 30Y may be performed independently of each other. This operation will also eliminate the need for the switching instruction unit 38 of the communication debugger 30Y.

As described above, in the second embodiment, the communication debugger 30Y, which includes the switching instruction unit 38, can thus send, to the virtual machines 10A and 10B, a setting instruction on response setting.

When the switching instruction unit 38 instructs the setting units 152A and 152B to set the response setting to the active setting, the switching instruction unit 38 instructs the setting unit 372Y to set the response setting to the inactive setting. This can prevent two or more ARP responses from being sent.

In addition, when the virtual machine 10B sets the response setting to the active setting, the setting unit 372Y detects that this response setting is the active setting, and sets the response setting to the inactive setting. This can prevent two or more ARP responses from being sent.

The configurations described in the foregoing embodiments are merely examples of various aspects of the present invention. These configurations may be combined with a known other technology, and moreover, a part of such configurations may be omitted and/or modified without departing from the spirit of the present invention.

REFERENCE SIGNS LIST 1 information processing apparatus; 2 host; 10 virtual platform; 10A, 10B virtual machine; 12A, 12B, 42 virtual network card; 20 root OS; 30X, 30Y communication debugger; 31 packet analysis unit; 32 log generation unit; 33 packet processing unit; 34 setting storage unit; packet storage unit; 36 ARP table storage unit; 38 switching instruction unit; 40 hypervisor; 50 log storage unit; 151A, 151B, 371X, 371Y response unit; 152A, 152B, 372X, 372Y setting unit; 300 fixed ARP table.

The invention claimed is:

1. An information processing apparatus comprising:
a plurality of virtual machines including a virtual machine having a function of sending an address request, and sending communication data to a destination address received as a response to the address request; and
communication logging circuitry to log communication data transferred between the virtual machine and another virtual machine in the plurality of virtual machines,
wherein, upon receiving an address request from the virtual machine, the communication logging circuitry sends an address of the communication logging circuitry as a destination address, to the virtual machine, and logs the communication data sent from the virtual machine,
the virtual machine including
first setting circuitry to make a first setting as to whether to send a first address that is an address of the virtual machine, in response to an address request from the another virtual machine for acquiring an address, and
first response circuitry to send the first address upon receiving the address request when the first setting is set to an active setting, the first response circuitry not sending the first address even upon receiving the address request when the first setting is set to an inactive setting; and
the communication logging circuitry including
second setting circuitry to make a second setting as to whether to send a second address that is the address of the communication logging circuitry, in response to the address request, and
second response circuitry to send the second address upon receiving the address request when the second setting is set to an active setting, the second response circuitry not sending the second address even upon receiving the address request when the second setting is set to an inactive setting, and
when the first setting is set to the inactive setting, the second setting circuitry sets the second setting to the active setting and the second response circuitry sends the second address to the other virtual machine that has sent the address request.

2. The information processing apparatus according to claim 1, wherein the communication logging circuitry further includes a switching instruction circuitry to instruct the first setting circuitry to make the first setting.

3. The information processing apparatus according to claim 2, wherein, when the first setting circuitry sets the first setting to the inactive setting, the second setting circuitry detects that the first setting is the inactive setting, and sets the second setting to the active setting.

4. The information processing apparatus according to claim 1, further comprising the other virtual machine, wherein
upon receiving the second address, the other virtual machine sets the second address as a destination, and sends first communication data, and
the communication logging circuitry sends, to the virtual machine, second communication data corresponding to the first communication data.

5. The information processing apparatus according to claim 4,
wherein
the communication logging circuitry further includes a packet analyzer to analyze whether a communication packet contained in the first communication data meets a specified condition from a user, and
when the communication packet meets the specified condition, the communication logging circuitry performs data processing on the first communication data.

6. The information processing apparatus according to claim 5, wherein the communication logging circuitry further includes:
a log generation circuitry to generate a communication log of the first communication data when the communication packet meets the specified condition; and
a log memory to store the communication log.

7. The information processing apparatus according to claim 5, wherein the communication logging circuitry further includes:
a packet memory to store the communication packet of the first communication data when the communication packet meets the specified condition; and
packet processing circuitry to, at sending re-performance timing, process the communication packet stored in the packet memory to generate the second communication data, and send the generated second communication data to the virtual machine, the sending re-performance timing being timing at which to retransmit the second communication data.

8. The information processing apparatus according to claim 5, further comprising:
packet processing circuitry to replace the first communication data with data specified by the user to generate the second communication data, and send the generated second communication data to the virtual machine when the communication packet meets the specified condition and the communication packet meets a replacement condition that is a condition for replacement.

9. The information processing apparatus according to claim 5, further comprising:
packet processing circuitry to stop sending the second communication data, restart sending the second communication data, or skip sending the second communication data when the communication packet meets the specified condition and the communication packet meets a sending change condition that is a condition for changing communication processing.

10. An information processing method comprising:
sending, from a virtual machine, an address request for acquiring an address to another virtual machine and to a communication logging circuitry that logs communication data;
sending, from the communication logging circuitry in response to the address request, an address response containing an address of the communication logging circuitry to the virtual machine;
sending first communication data from the virtual machine to the address in the address response received as the response to the address request;
receiving the first communication data at the communication logging circuitry; and
sending second communication data corresponding to the first communication data from the communication logging circuitry to the another virtual machine,
the virtual machine including
first setting circuitry to make a first setting as to whether to send a first address that is an address of the virtual machine, in response to an address request from the another virtual machine for acquiring an address, and
first response circuitry to send the first address upon receiving the address request when the first setting is set to an active setting, the first response circuitry not sending the first address even upon receiving the address request when the first setting is set to an inactive setting; and
the communication logging circuitry including
second setting circuitry to make a second setting as to whether to send a second address that is the address of the communication logging circuitry, in response to the address request, and
second response circuitry to send the second address upon receiving the address request when the second setting is set to an active setting, the second response circuitry not sending the second address even upon receiving the address request when the second setting is set to an inactive setting, and
when the first setting is set to the inactive setting, the second setting circuitry sets the second setting to the active setting and the second response circuitry sends the second address to the other virtual machine that has sent the address request.

\* \* \* \* \*